(12) United States Patent
Wyles et al.

(10) Patent No.: US 9,872,145 B2
(45) Date of Patent: Jan. 16, 2018

(54) PROVIDING STREAMING GEOLOCATION INFORMATION

(71) Applicant: Viavi Solutions UK Limited, Berkshire (GB)

(72) Inventors: David Christopher Wyles, Berkshire (GB); John Joseph Holden, Reading (GB); David Antony Razzetti, Derby (GB); Gareth James Smith, Berkshire (GB); Peter Kenington, Chepstow (GB)

(73) Assignee: Viavi Solutions UK Limited, Berkshire (GB)

( * ) Notice: Subject to any disclaimer, the term of this patent is extended or adjusted under 35 U.S.C. 154(b) by 53 days.

(21) Appl. No.: 14/953,932

(22) Filed: Nov. 30, 2015

(65) Prior Publication Data

US 2016/0157060 A1    Jun. 2, 2016

Related U.S. Application Data

(60) Provisional application No. 62/085,913, filed on Dec. 1, 2014.

(51) Int. Cl.
*H04W 4/02* (2009.01)
*H04W 24/08* (2009.01)
(Continued)

(52) U.S. Cl.
CPC .............. *H04W 4/025* (2013.01); *G01S 5/02* (2013.01); *H04W 24/08* (2013.01); *H04W 64/006* (2013.01)

(58) Field of Classification Search
CPC ... H04W 64/006; H04W 24/08; H04W 4/025; H04W 4/02; H04W 4/021; H04W 4/023;
(Continued)

(56) References Cited

U.S. PATENT DOCUMENTS 7,840,222 B2 * 11/2010 Hampel ............... G06Q 20/382
455/456.1
8,374,596 B2    2/2013 Thiel et al.
(Continued)

FOREIGN PATENT DOCUMENTS

EP    2 602 634 A1    6/2013
EP    2 983 003 A1    2/2016

OTHER PUBLICATIONS

U.S. Appl. No. 14/141,871, Peter Kenington et al., "Method and Apparatus for Deriving Indoor/Outdoor Classification Information," filed Dec. 27, 2013, 36 pages.
(Continued)

*Primary Examiner* — Meless Zewdu

(74) *Attorney, Agent, or Firm* — Harrity & Harrity, LLP

(57) ABSTRACT

A device may obtain event information regarding a set of user equipment. The device may determine a first location for a particular user equipment, of the set of user equipment, based on the event information and a stored set of parameters. The device may provide information associated with identifying the first location. The device may determine a second location for the particular user equipment based on the information associated with identifying the first location and after determining the first location. The device may provide information associated with identifying the second location. The device may update the stored set of parameters as a set of updated parameters. The device may use the set of updated parameters to determine another location.

20 Claims, 6 Drawing Sheets

(51) Int. Cl.
*H04W 64/00* (2009.01)
*G01S 5/02* (2010.01)

(58) Field of Classification Search
CPC ... H04W 64/00; H04W 64/003; H04W 40/20; H04W 48/04; H04W 4/028; G01S 5/02; G01S 5/0252; G01S 5/0289
See application file for complete search history.

(56) References Cited

U.S. PATENT DOCUMENTS

| | | | | |
|---|---|---|---|---|
| 9,420,396 | B2* | 8/2016 | Oerton | H04W 4/00 |
| 2003/0069027 | A1* | 4/2003 | Heinonen | G01S 5/0252 |
| | | | | 455/456.1 |
| 2006/0030332 | A1* | 2/2006 | Carrott | G01S 5/06 |
| | | | | 455/456.1 |
| 2010/0120449 | A1* | 5/2010 | Jakorinne | G01S 5/0018 |
| | | | | 455/456.1 |
| 2011/0177825 | A1* | 7/2011 | Huang | H04W 64/00 |
| | | | | 455/456.1 |
| 2011/0177832 | A1* | 7/2011 | Huang | G01S 5/02 |
| | | | | 455/457 |
| 2011/0287778 | A1 | 11/2011 | Levin et al. | |
| 2011/0319093 | A1 | 12/2011 | Flanagan | |
| 2012/0047184 | A1* | 2/2012 | Purdy | G06Q 30/0204 |
| | | | | 707/803 |
| 2013/0122855 | A1 | 5/2013 | Kenington et al. | |
| 2013/0122925 | A1 | 5/2013 | Flanagan et al. | |
| 2013/0122926 | A1 | 5/2013 | Kenington et al. | |
| 2013/0210449 | A1 | 8/2013 | Flanagan | |
| 2013/0210450 | A1 | 8/2013 | Kenington et al. | |
| 2013/0281130 | A1* | 10/2013 | Yang | G01S 19/09 |
| | | | | 455/456.3 |
| 2014/0094199 | A1 | 4/2014 | Palanki et al. | |
| 2014/0139375 | A1* | 5/2014 | Faragher | G01S 5/0294 |
| | | | | 342/451 |
| 2014/0171102 | A1 | 6/2014 | Murphy et al. | |
| 2014/0171103 | A1 | 6/2014 | Murphy et al. | |
| 2014/0278086 | A1* | 9/2014 | San Filippo | G01C 21/3423 |
| | | | | 701/527 |
| 2014/0287745 | A1* | 9/2014 | Edwards | H04W 60/00 |
| | | | | 455/433 |
| 2015/0038162 | A1* | 2/2015 | Duleba | H04W 4/028 |
| | | | | 455/456.1 |

OTHER PUBLICATIONS

U.S. Appl. No. 14/451,931, Stefan Ulrich Thiel et al., "Techniques for Multiple Pass Geolocation," filed Aug. 5, 2014, 55 pages.
Extended European Search Report corresponding to EP Application No. 15 19 6447, dated Apr. 26, 2016, 7 pages.

* cited by examiner

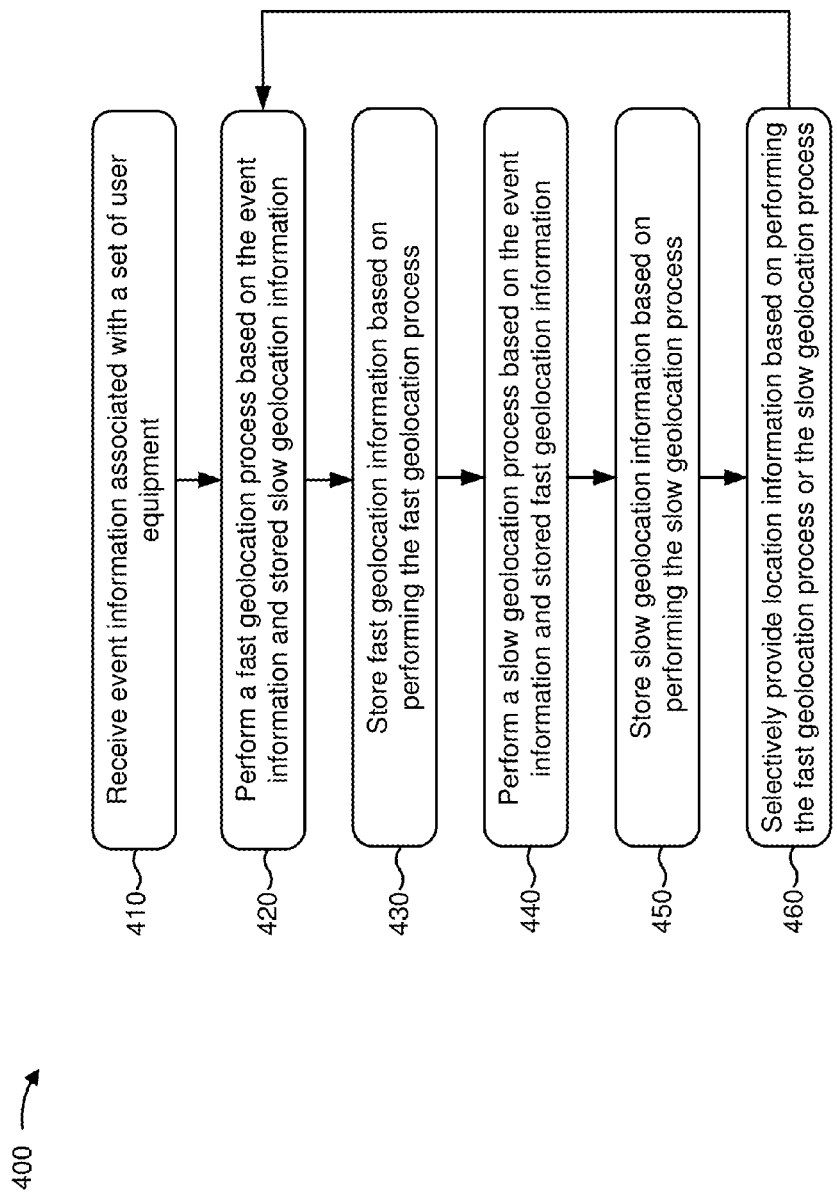

PROVIDING STREAMING GEOLOCATION INFORMATION

RELATED APPLICATION(S)

This application claims priority under 35 U.S.C. §119 to U.S. Provisional Patent Application No. 62/085,913, filed on Dec. 1, 2014, the content of which is incorporated by reference herein in its entirety.

BACKGROUND

A user equipment may include a module that determines and provides, to a base station, information associated with operating on a radio access network (RAN), such as timing information, radio measurements, or the like. A network device of the RAN may receive the information from the user equipment (e.g., via the base station), and may cause a location to be determined for the user equipment. The location for the user equipment may be periodically provided to another device, such as an application server associated with providing location dependent information to one or more user equipment, such as an advertisement, a public service announcement, a public safety announcement, or the like. Additionally, or alternatively, the location for the user equipment may be reported to an operator of the RAN to permit the operator of the RAN to tune one or more network parameters of the RAN.

SUMMARY

According to some possible implementations, a device may include one or more processors. The one or more processors may pre-calculate, based on a set of received measurements, information associated with determining a set of locations for a set of user equipment. The one or more processors may determine, based on one or more measurements and the pre-calculated information, one or more locations associated with one or more user equipment. A particular location, of the one or more locations, being associated with a particular user equipment, of the one or more user equipment, at a particular time. The one or more processors may provide information identifying the one or more locations based on determining the one or more locations.

According to some possible implementations, a non-transitory computer-readable medium may store one or more instructions that, when executed by one or more processors, may cause the one or more processors to receive, in near real-time, event information regarding a user equipment. The one or more instructions, when executed by one or more processors, may cause the one or more processors to obtain, from a data structure, stored slope-intercept information associated with identifying a location of the user equipment. The one or more instructions, when executed by one or more processors, may cause the one or more processors to determine, in near real-time relative to receiving the event information, a first location of the user equipment based on the event information and the stored slope-intercept information. The one or more instructions, when executed by one or more processors, may cause the one or more processors to provide, in near real-time relative to receiving the event information, information identifying the first location. The one or more instructions, when executed by one or more processors, may cause the one or more processors to determine, based on the event information and after determining the first location, updated slope-intercept information. The one or more instructions, when executed by one or more processors, may cause the one or more processors to store the updated slope-intercept information for utilization in determining another location in real-time or near-real time. The one or more instructions, when executed by one or more processors, may cause the one or more processors to determine, based on the updated slope-intercept information, a second location of the user equipment. The second location may be more accurate than the first location. The one or more instructions, when executed by one or more processors, may cause the one or more processors to provide information identifying the second location.

According to some possible implementations, a method may include obtaining, by a device, event information regarding a set of user equipment. The method may include determining, by the device, a first location for a particular user equipment, of the set of user equipment, based on the event information and a stored set of parameters. The method may include providing, by the device, information associated with identifying the first location. The method may include determining, by the device, a second location for the particular user equipment based on the information associated with identifying the first location and after determining the first location. The method may include providing, by the device, information associated with identifying the second location. The method may include updating, by the device, the stored set of parameters as a set of updated parameters. The method may include using, by the device, the set of updated parameters to determine another location.

BRIEF DESCRIPTION OF THE DRAWINGS

FIG. 4 is a flow chart of an example process for providing near real-time geolocation information.

DETAILED DESCRIPTION

Figure 1A:
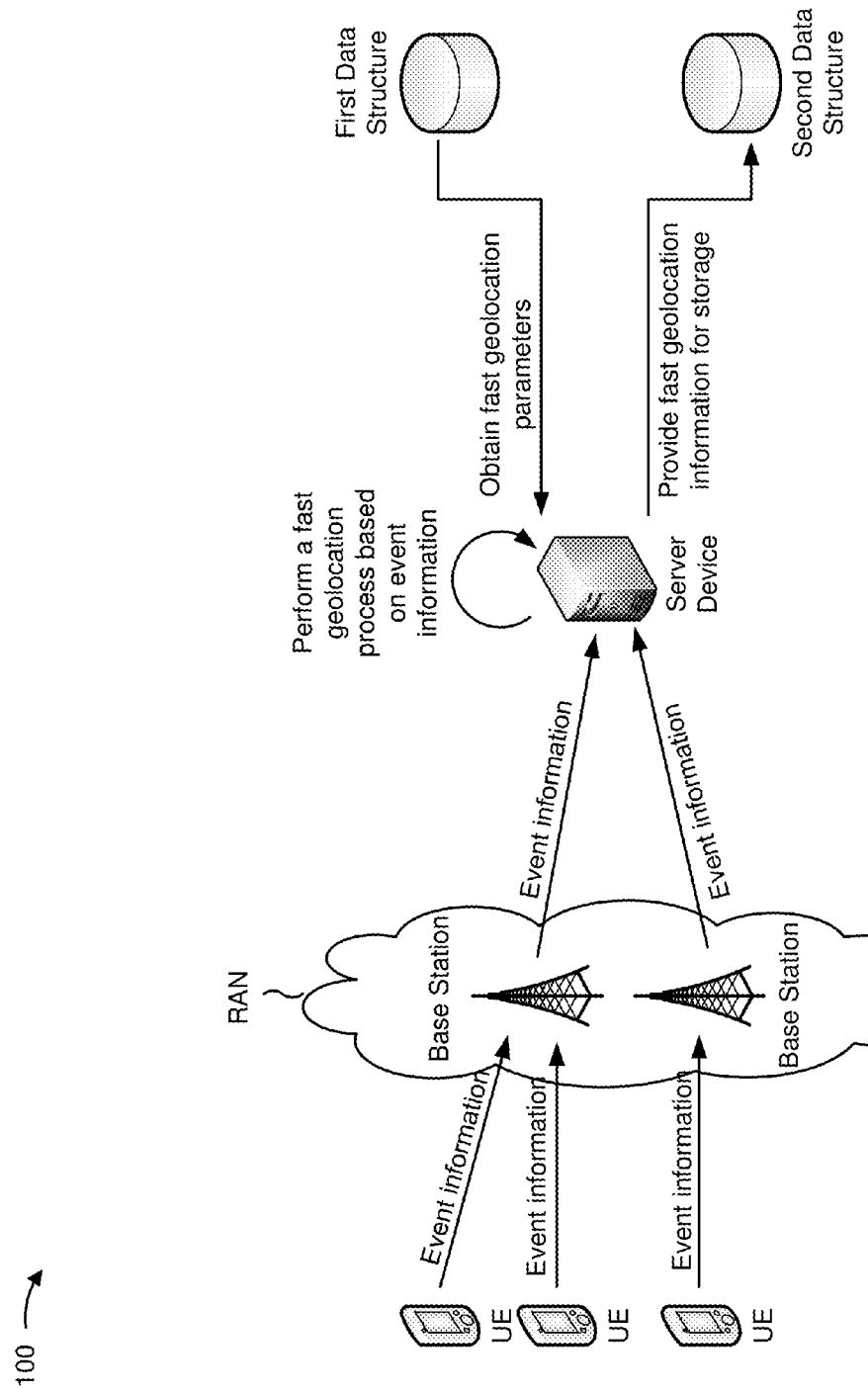
FIGS. 1A and 1B are diagrams of an overview of an example implementation described herein.

The following detailed description of example implementations refers to the accompanying drawings. The same reference numbers in different drawings may identify the same or similar elements.

An operator of an application server may desire to transmit location dependent information to one or more user equipment located within a particular proximity to a particular location. For example, a particular application server associated with a retail store may provide an advertisement regarding the retail store to one or more user equipment within a particular proximity of the retail store. In this way, the particular application server may cause one or more users of the one or more user equipment to shop at the retail store. Additionally, or alternatively, another particular application server associated with a government entity (e.g., a police department, a fire department, or the like) may provide a warning message, indicating a safety issue concerning a particular location, to one or more user equipment within a particular proximity of the particular location. In this way, the other particular application server may cause one or more users of the one or more user equipment to avoid the particular location. As another example, a network operator may tune one or more network parameters based on information identifying locations of one or more user equipments.

A network device (e.g., a base station, an eNodeB, etc.) may receive information associated with determining a location for a user equipment. The network device store the information, and may periodically provide the information to a server device (or a group of server devices) for processing. For example, the server device may receive information associated with geo-locating a set of user equipment at a particular interval (e.g., every 15 minutes, 30 minutes, 1 hour, etc.), and may process the information. Geo-locating the set of user equipment may refer to determining a set of locations for the set of user equipment. Based on processing the information, the server device may geo-locate the set of user equipment, and may provide information identifying a set of locations for the set of user equipment. However, information provided periodically may be inaccurate, outdated, or require time-intensive processing (e.g., 5 minutes, 15 minutes, etc.), causing the server device to determine and provide an inaccurate or outdated set of locations for the set of user equipment. This may cause an application server to provide a message to one or more user equipment not within the particular proximity based on the inaccurate or outdated set of locations. Alternatively, this may cause the application server to not provide the message to one or more user equipment within the particular proximity based on the inaccurate or outdated set of locations.

Implementations, described herein, may provide streaming (e.g., real-time or near real-time relative to receiving event information, such as in less than 2 minutes to facilitate near real-time targeting of user equipment for messages or in less than 15 minutes to reduce a likelihood that messages are targeted to incorrect user equipment as a result of out of date information) location information for one or more user equipment, thereby permitting a network device and/or another device to accurately locate the one or more user equipment. In this way, a network may reduce a quantity of messages that are transmitted by more accurately determining which user equipment are located at a particular location associated with receiving a particular message relative to utilizing outdated or inaccurate information. As used herein, near real-time refers to real-time or approximately real-time (e.g., relative to receiving event information, such as within 2 minutes to facilitate near real-time targeting of user equipment for messages, within 15 minutes to facilitate reducing a likelihood of targeting incorrect user equipment as a result of outdated information, or the like).

Figure 1B:
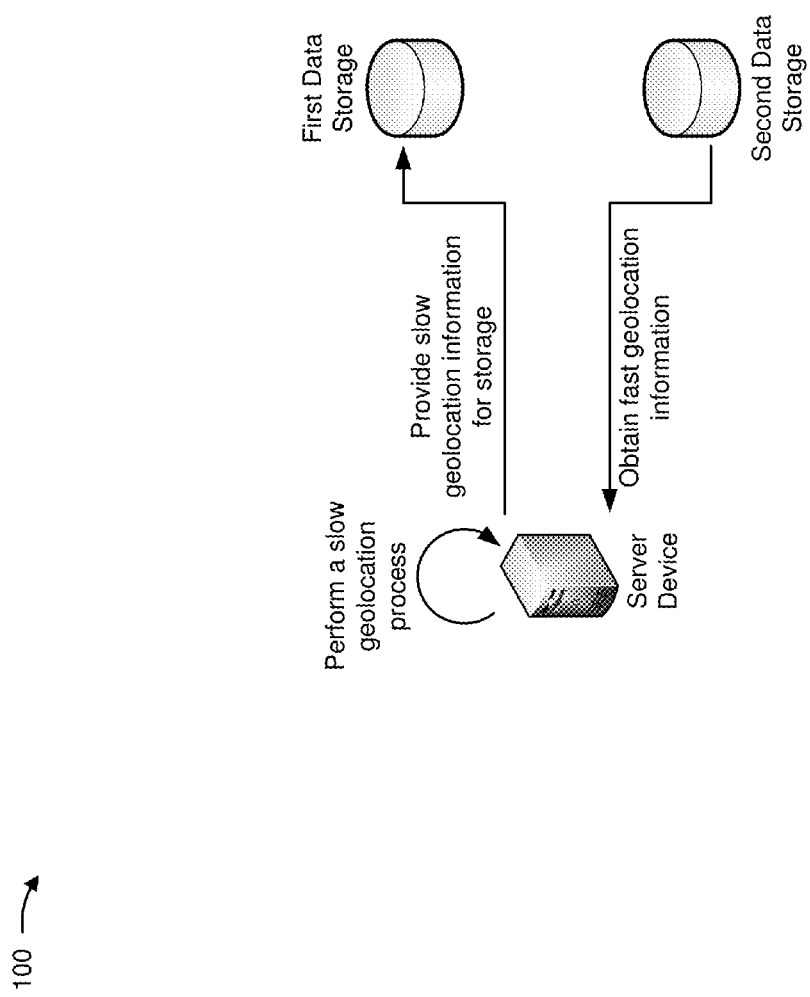

FIGS. 1A and 1B are diagrams of an overview of an example implementation 100 described herein. As shown in FIG. 1A, example implementation 100 may include a set of user equipment, a set of base stations of a radio access network (RAN), and a server device. The set of user equipment (e.g., "UEs") may perform a set of measurements associated with a set of events (e.g., a call, a subscriber network event, etc.), and provide event information identifying the set of measurements. The event information may include a measurement (e.g., a radio measurement), timing information, or the like that is provided by a user equipment to permit the user equipment to operate on a network. The event information may be processed for utilization in geo-locating the user equipment. For example, a particular user equipment may determine event information associated with a particular call, such as a round-trip time delay, a signal strength, or the like, and may provide the event information to the server device. Additionally, or alternatively, a particular base station, of the set of base stations, may determine the event information associated with the particular call, and may provide the event information to the server device. The event information may include a measurement, identification information associated with the measurement, or the like. For example, a particular user equipment may provide event information that includes information identifying a time of a particular connection segment (e.g., a portion of a call), a measurement relating to the particular connection segment, or the like. Additionally, or alternatively, the event information may include information with identification information identifying a user equipment, such as an international mobile subscriber identity (IMSI), a user identifier, or the like. Additionally, or alternatively, the particular user equipment may provide event information relating to operation on a network, and a base station, server device, or the like may process the event information to identify connection segments, calls, or the like.

The server device may obtain, from a first data structure, a set of fast geolocation parameters determined based on performing a slow geolocation process. The set of fast geolocation parameters may include one or more parameters relating to determining a location of a user equipment, such as a slope-intercept value (e.g., a pathloss estimation value) or the like. A slope-intercept value (e.g., a pathloss estimation value) may refer to a pre-calculated value associated with corresponding a metric associated with a call (e.g., a signal strength) to information identifying a location of a user equipment (e.g., a distance from a base station). For example, the server device may determine, when performing a slow geolocation process, an observed rate of decay of signal strength with regard to distance from a base station (slope) and a starting point from which this decay occurs (intercept), and may store information identifying the slope and intercept as an expected rate of decay (e.g., an expected degradation) of signal strength with regard to distance. In some implementations, the server device may adjust the slope-intercept value based on a transmit power level of the base station, an antenna gain, a local radio environment (e.g., signal noise associated with other devices interfering with a signal), or the like. In some implementations, the server device may include a group of server devices utilizing one or more synchronization techniques to perform concurrent processing of the event information.

The server device may perform a fast geolocation process for a user equipment of the set of user equipment based on the event information and the set of fast geolocation parameters. For example, the server device may utilize a particular slope-intercept value and a particular measurement to determine a proximity of a particular user equipment to a particular base station. In this case, the server device may determine the proximity with a first level of accuracy (e.g., a level of accuracy that is less accurate than a second level of accuracy when performing a slow geolocation process). The server device may store information associated with performing the fast geolocation process via a second data structure for utilization in performing a slow geolocation process. For example, the server device may store a location for the particular user equipment, information identifying a connection segment based on which the location was determined, or the like. The server device may provide output (e.g., to an application server) identifying a location for the particular user equipment and information identifying the user equipment in real-time or near real-time (relative to receiving event information). In this way, a server device utilizes pre-calculated information to determine a location for a user equipment in real-time or near real-time (relative to receiving event information) with a particular level of accuracy, and provide information identifying the location in real-time or near real-time (relative to receiving event information) for utilization.

As shown in FIG. 1B, the server device may perform slow geolocation. For example, the server device may obtain the information associated with fast geolocation from the second data structure. The information associated with fast geolocation may include a measurement, a location determined based on the measurement, a time at which the measurement was performed, information identifying the user equipment, or the like. The server device may obtain other information, such as information regarding one or more previous or subsequent connection segments (e.g., measurements performed regarding other connection segments of a call performed by the particular user equipment), information regarding one or more other user equipment, information regarding a previous or subsequent location of the user equipment, or the like. The server device may determine a location for the particular user equipment based on the measurement, the information associated with the one or more other connection segments, the information regarding the one or more other user equipment, or the like. For example, the server device may determine updated slope-intercept values based on measurements from multiple other user equipment, and may aggregate multiple measurements for the particular user equipment to calculate a location based on the updated slope-intercept information. In this case, the location for the particular user equipment may be determined with a second level of accuracy that is higher than the first level of accuracy (e.g., the location determined based on performing a slow geolocation process is more accurate than the location determined based on performing a fast geolocation process).

The server device may provide information associated with performing the slow geolocation process, such as the location of the user equipment or the like as output when a higher level of accuracy is requested than the first level of accuracy, such as for network diagnostics, forensic investigation, or the like. The server device may store information associated with performing the slow geolocation process. For example, the server device may store the updated slope-intercept values via the first data structure for utilization in performing another fast geolocation. In this way, the server device refines a location for a user equipment to a more accurate location and pre-calculates information for a subsequent real-time or near real-time geolocation.

Although implementations, described herein, may be described in terms of "fast" and "slow," such as a "fast geolocation" and a "slow geolocation," these terms are to be understood as relative to each other (e.g., slow geolocation may take more time than fast geolocation) and for clarification and are not intended to suggest or imply a particular time-frame. For example, although the server device may be described as including a "fast geolocation processor" and a "slow geolocation processor," these terms may be understood as a "first geolocation processor" and a "second geolocation processor," respectively.

Figure 2A:
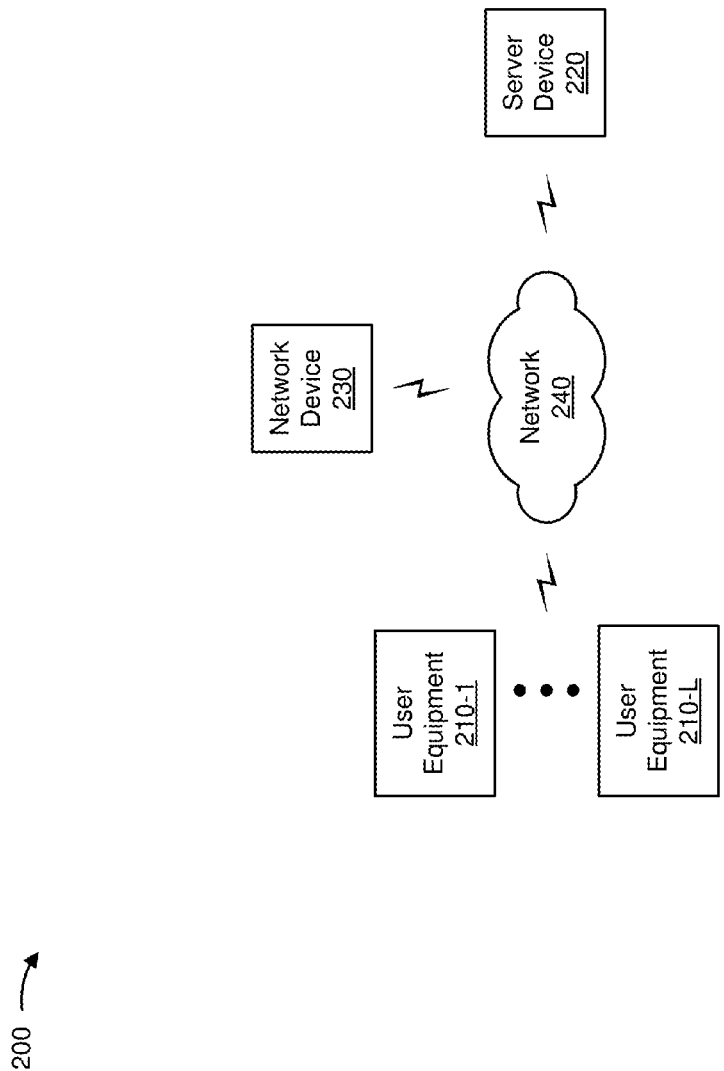
FIGS. 2A and 2B are diagrams of an example environment in which systems and/or methods, described herein, may be implemented.
Figure 2B:
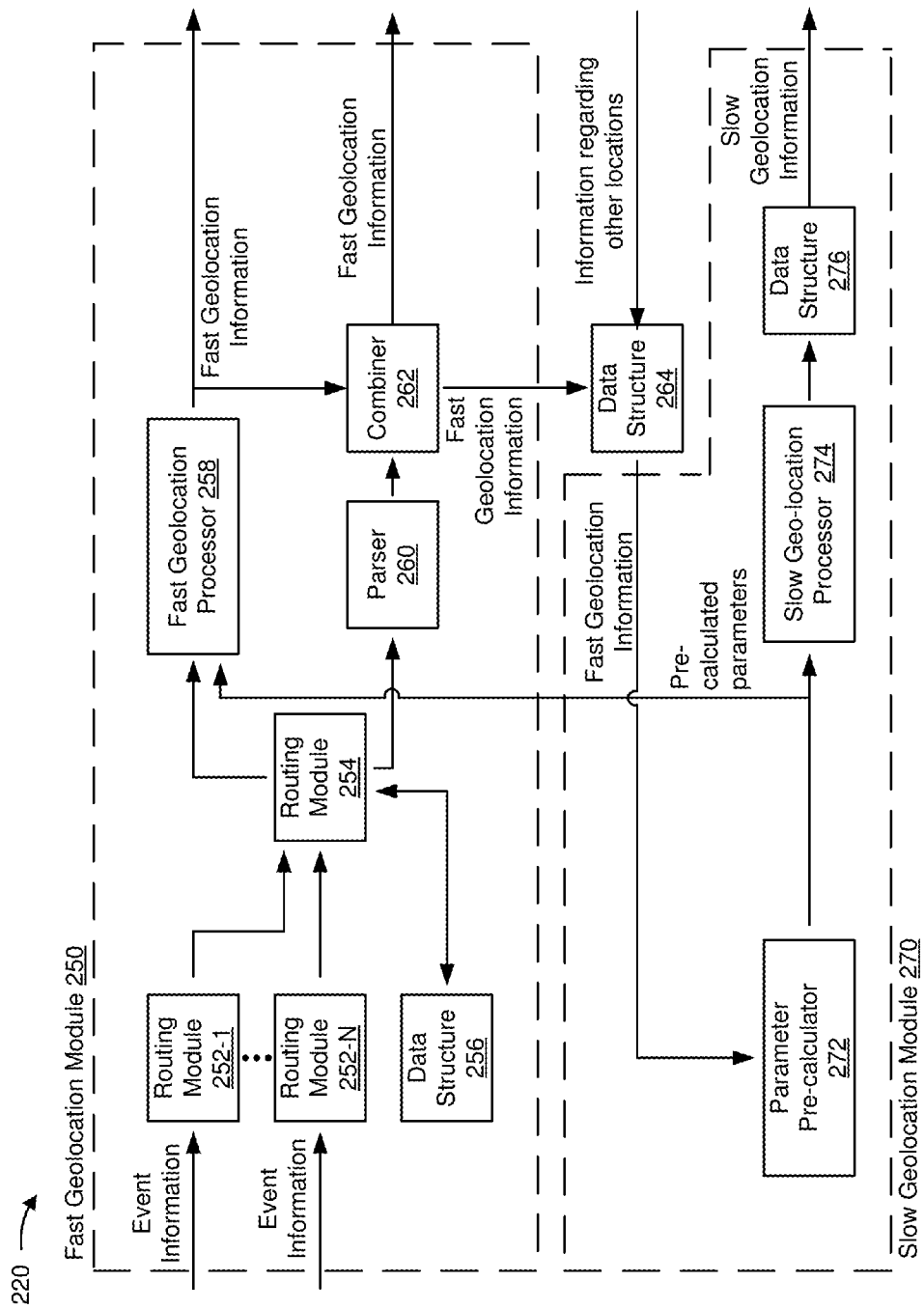

FIGS. 2A and 2B are diagrams of an example environment 200 in which systems and/or methods, described herein, may be implemented. As shown in FIG. 2A, environment 200 may include one or more user equipment 210-1 through 210-L (L≥1) (hereinafter referred to collectively as "user equipment 210," and individually as "user equipment 210"), a server device 220, a network device 230, and a network 240. Devices of environment 200 may interconnect via wired connections, wireless connections, or a combination of wired and wireless connections.

User equipment 210 may include one or more devices capable of receiving, generating, storing, processing, and/or providing information associated with determining a location. For example, user equipment 210 may include a communication device, such as a mobile phone (e.g., a smart phone, a radiotelephone, etc.), a wireline phone, a satellite phone, an audio player, a video player, a personal media player, a personal video recorder (PVR), a computer (e.g., a laptop computer, a tablet computer, a handheld computer, a desktop computer, etc.), a gaming device, a navigation device, a television, a network printer, a fitness device, a medical device, a wearable communication device (e.g., a smart wristwatch, a pair of smart eyeglasses, etc.), or a similar type of device. In some implementations, user equipment 210 corresponds to one or more of the user equipment shown in FIG. 1A. In some implementations, user equipment 210 may receive information from and/or transmit information to another device in environment 200.

Server device 220 may include one or more devices capable of storing, processing, and/or routing information associated with a location. For example, server device 220 may include a server, a group of servers, a cluster of servers, etc. that receives information associated with a set of user equipment 210 and determines a location for the set of user equipment 210. In some implementations, server device 220 may utilize a synchronization technique to synchronize processing utilizing multiple server devices 220 of a cluster of server devices 220. In some implementations, server device 220 may be operated by a network operator. In some implementations, server device 220 may be associated with a particular location. For example, network 240 may deploy multiple server devices 220 assigned to respective locations, thereby permitting the multiple server devices 220 to perform geolocation for the respective locations within a desired period of time. In some implementations, the desired period of time may be less than 2 minutes from receiving a connection segment. In this way, server device 220 facilitates real-time or near real-time utilization of location information. In some implementations, the desired period of time may be less than 15 minutes from receiving a connection segment. In this way, server device 220 facilitates utilization of location information that is less likely to be out of date than other techniques which may utilize greater delays in providing location information. In some implementations, server device 220 corresponds to the server device shown in FIGS. 1A and 1B. In some implementations, server device 220 may include a communication interface that allows server device 220 to receive information from and/or transmit information to other devices in environment 200.

Network device 230 may include one or more devices (e.g., one or more traffic transfer devices, processing devices, server devices, data storage devices, or the like) associated with network 240. For example, network device 230 may include one or more base stations, a mobility management entity (MME), a serving gateway (SGW), a packet data network gateway (PGW), a home subscriber server (HSS), an authentication, authorization, and accounting server (AAA), an operations support system (OSS), or the like. In some implementations, network device 230 may provide information (e.g., real-time or near real-time information associated with geo-locating user equipment 210) to a routing module of server device 220. In some implementations, network device 230 may be operated by a network operator. In some implementations, network device 230 corresponds to one or more of the base stations shown in FIG. 1A. In some implementations, network device 230 may include a communication interface that allows network device 230 to receive information from and/or transmit information to other devices in environment 200.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

As shown in FIG. 2B, server device 220 may include a set of components associated with performing geolocation. For example, server device 220 may include a fast geolocation module 250 associated with performing a fast geolocation process. Fast geolocation module 250 may include one or more routing modules 252-1 through 252-N(N≥1) (hereinafter referred to collectively as "routing modules 252," and individually as "routing module 252"), another routing module 254, a data structure 256, a fast geolocation processor 258, a parser 260, and a combiner 262.

Routing modules 252 may receive real-time or near real-time information from network device 230 and/or user equipment 210, and may direct the information to routing module 254. In some implementations, routing modules 252 may synchronize multiple data streams. For example, server device 220 may utilize routing modules 252 to correlate first event information and second event information regarding a particular user equipment 210 (e.g., information regarding consecutive connection segments), and may utilize the first event information and the second event information to determine a location for the particular user equipment 210. As another example, routing modules 252 may receive a first data stream of event information and a second data stream of identity information (e.g., information identifying user equipment 210), and may correlate the first data stream and the second data stream to associate the identity information with the event information. In this case, routing modules 252 may group event information associated with different events based on identity information identifying a particular user equipment 210 associated with the different events.

Routing module 254 may receive the real-time or near real-time information and archived information (e.g., stored information regarding connection segments, calls, etc.) from data structure 256. Routing module 254 may direct information to fast geolocation processor 258 and/or parser 260.

Fast geolocation processor 258 may receive information from routing module 254 and/or a set of fast geolocation parameters (e.g., pre-calculated slope-intercept values), and may determine a location for user equipment 210. Fast geolocation processor 258 may provide fast geolocation information (e.g., the location) as output to an application server and/or to combiner 262.

Parser 260 may determine a set of call quality metrics associated with the information received from network device 230, and may provide the set of call quality metrics to combiner 262. Combiner 262 may associate the set of call quality metrics with the location for user equipment 210 determined by fast geolocation processor 258. Combiner 262 may provide fast geolocation information (e.g., the associated information) as output and/or may provide the fast geolocation information (e.g., the associated information) for storage via data structure 264. In some implementations, parser 260 may operate concurrently with fast geolocation processor 258. For example, fast geolocation processor 258 may determine a location of a particular connection segment (performed by user equipment 220) and parser 260 may determine an identity of user equipment 220 (e.g., a subscriber identity). In this case, combiner 262 may correlate the location and the identity of user equipment 220 to provide a location for user equipment 220 at a particular connection segment.

Data structure 264 may receive the associated information from combiner 262. Additionally, or alternatively, data structure 264 may receive information regarding one or more other network areas (e.g., another base station, another city, another region, etc.). Data structure 264 may provide stored information for utilization in pre-calculating a set of slope-intercept values. In some implementations, data structure 264 may store a set of connection segments with associated locations, which may be utilized to pre-calculate the set of slope-intercept values.

As further shown in FIG. 2B, server device 220 may include a slow geolocation module 270. Slow geolocation module 270 may include parameter pre-calculator 272, slow geolocation processor 274, data structure 276, or the like. Parameter pre-calculator 272 may receive information from data structure 264 relating to one or more connection segments, and may pre-calculate a set of parameters associated with performing geolocation. For example, parameter pre-calculator 272 may determine a set of slope-intercept values for a set of locations (e.g., a set of cells) for which data has been received. Parameter pre-calculator 272 may provide the set of parameters to fast geolocation processor 258 and/or slow geolocation processor 274. Slow geolocation processor 274 may determine a location for user equipment 210 (e.g., a more accurate location than fast geolocation processor 258 based on updated slope-intercept values, subsequent connection segments, or the like), and may provide information identifying the location for storage via data structure 276 and/or for output.

The number and arrangement of components, devices, and networks shown in FIGS. 2A and 2B are provided as an example. In practice, there may be additional components, devices, and/or networks, fewer components, devices, and/or networks, different components, devices, and/or networks, or differently arranged components, devices, and/or networks than those shown in FIGS. 2A and 2B. Furthermore, two or more components and/or devices shown in FIGS. 2A and 2B may be implemented within a single component and/or device, or a single component and/or device shown in FIGS. 2A and 2B may be implemented as multiple, distributed components and/or devices. Additionally, or alternatively, a set of components and/or devices (e.g., one or more components and/or devices) of environment 200 may perform one or more functions described as being performed by another set of components and/or devices of environment 200.

Figure 3:
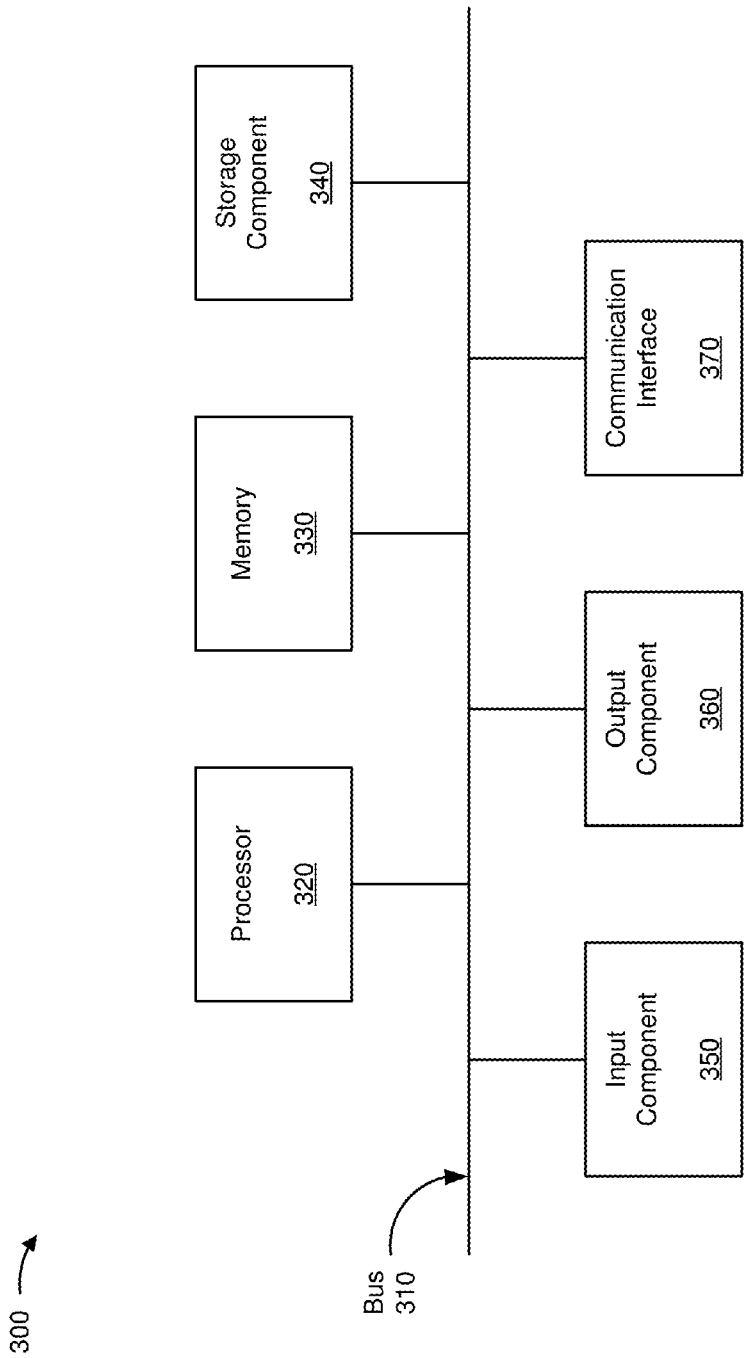
FIG. 3 is a diagram of example components of one or more devices of FIG. 2.

FIG. 3 is a diagram of example components of a device 300. Device 300 may correspond to user equipment 210, server device 220, and/or network device 230. In some implementations, user equipment 210, server device 220, and/or network device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing real-time or near real-time geolocation information. In some implementations, one or more process blocks of FIG. 4 may be performed by server device 220. In some implementations, one or more process blocks of FIG. 4 may be performed by another device or a group of devices separate from or including server device 220, such as user equipment 210 and/or network device 230.

As shown in FIG. 4, process 400 may include receiving event information associated with a set of user equipment (block 410). For example, server device 220 may receive the event information associated with the set of user equipment. Event information may include information regarding an event, such as a call, a connection segment (e.g., a portion of a call), a selection to a particular radio access network, a request for data, receipt of data, or the like. For example, event information may include identification information associated with a particular user equipment 210 associated with the event (e.g., a IMSI of user equipment 210, a user identifier, etc.), measurement information associated with an event (e.g., a round-trip time delay, a signal strength, etc.), identification information associated with an event (e.g., information identifying a call, information identifying a caller, information identifying a call recipient, information identifying a call type, etc.), a time at which the event occurred (e.g., a time at which a measurement was performed), or the like.

In some implementations, server device 220 may receive the event information from network device 230, such as a base station that performs measurements associated with user equipment 210 connected to the base station. For example, the base station may determine the event information based on performing a measurement for user equipment 210. Additionally, or alternatively, server device 220 may receive the event information from user equipment 210 (e.g., based on user equipment 210 performing a measurement and via network device 230).

As further shown in FIG. 4, process 400 may include performing a fast geolocation process based on the event information and stored slow geolocation information (block 420). For example, server device 220 may perform a fast geolocation process (e.g., a first geolocation that can be performed faster than a second, slow geolocation) based on the event information and the stored slow geolocation information. In some implementations, server device 220 may obtain the slow geolocation information from a data structure. For example, server device 220 may obtain stored slope-intercept values calculated based on a previous geolocation of one or more user equipment 210 (e.g., a slow geolocation). In some implementations, server device 220 may obtain stored slow geolocation information regarding a particular location. For example, server device 220 may determine a particular base station to which user equipment 210 is connected, and may obtain slow geolocation information associated with the particular base station and/or a location associated with the particular base station.

In some implementations, server device 220 may obtain other event information. For example, server device 220 may determine that a particular user equipment 210 is associated with a particular connection segment of a call, and may identify other stored event information including one or more other connection segments of the same call. In this case, server device 220 may utilize the other stored event information to perform the fast geolocation process. In some implementations, server device 220 may obtain a threshold quantity of other connection segments. For example, server device 220 may identify a set of connection segments associated with user equipment 210, and may select a threshold quantity of connection segments of the set of connection segments for utilization in geolocating user equipment 210. Additionally, or alternatively, server device 220 may select one or more connection segments within a threshold period of time of a connection segment. For example, server device 220 may select one or more connection segments within 30 seconds, 1 minute, etc. of a connection segment included in the event information.

In some implementations, server device 220 may determine a location for a particular user equipment 210 based on the event information and the stored slow geolocation information. For example, based on event information including signal strength information associated with a particular user equipment 210 and a set of slope-intercept values associated with signal strength degradation, server device 220 may determine a location for the particular user equipment 210 (e.g., a proximity to one or more base stations). Additionally, or alternatively, server device 220 may determine the location based on the other event information associated with the one or more other connection segments. For example, server device 220 may utilize information regarding multiple connection segments to identify a location for user equipment 210, such as by identifying an expected movement of user equipment 210, averaging a location of user equipment 210, or the like. In this way, server device 220 may utilize pre-calculated information to determine a location for user equipment 210 in real-time or near real-time (e.g., within less than approximately 2 minutes, 15 minutes, or the like of the connection segment, from which the location was determined, occurring), thereby reducing a likelihood that the location is inaccurate or outdated.

In some implementations, server device 220 may identify a sector in which user equipment 210 is located based on the slope-intercept values and the event information, and may determine a location for user equipment 210 based on the sector. For example, when server device 220 determines slope-intercept values for multiple sectors of a coverage area (each sector corresponding to a location), server device 220 may select a particular slope-intercept value for locating user equipment 210, and may determine the location for user equipment 210 based on the sector corresponding to the particular slope-intercept value.

In some implementations, server device 220 may determine a location for user equipment 210 with a particular level of accuracy based on performing a fast geolocation process. For example, server device 220 may determine a first location for user equipment 210 with a first level of accuracy (e.g., based on performing a fast geolocation process) and a second location for user equipment 210, with a second higher level of accuracy (e.g., based on performing a slow geolocation process using additional information not available in real-time or near real-time, such as information regarding subsequent connection segments). In this case, server device 220 may provide information identifying the first location or the second location at different times and/or for a different utilization. For example, server device 220 may provide information identifying the first location in real-time or near real-time for locating user equipment 210 within a network. In this way, server device 220 permits improved targeting of user equipment 210 for location dependent information, such as an advertisement, a public safety announcement, or the like relative to utilizing non real-time or near real-time information. For example, by providing information identifying the first location in less than 2 minutes, server device 220 permits a business to target user equipment 210 for an advertisement while a user of user equipment 210 is within 2 minutes of the store, thereby increasing a likelihood that the user responds to the advertisement by going to the business.

As another example, by providing information identifying the first location in less than 15 minutes, server device 220 permits a public safety organization to target user equipment 210 within 15 minutes of a dangerous area, thereby reducing a likelihood that user equipment 210 enter the dangerous area. Similarly, server device 220 may provide information identifying the second location in non-real-time or near real-time, for a diagnostic service, such as identifying a network performance issue for network 240, performing a forensic investigation as to a location of user equipment 210, or the like.

Additionally, or alternatively, server device 220 may apply an adjustment to the location for user equipment 210 based on the stored slow geolocation information when performing a fast geolocation process. For example, when the stored slow geolocation information indicates that user equipment 210 is traveling via a road, and server device 220 determines that user equipment 210 is adjacent to and within a threshold proximity of the road, server device 220 may alter the location to indicate that user equipment 210 is on the road rather than adjacent to and within the threshold proximity of the road. In this way, server device 220 may utilize the stored slow geolocation information to improve a level of accuracy of a location determined based on performing a fast geolocation process.

As further shown in FIG. 4, process 400 may include storing fast geolocation information based on performing the fast geolocation process (block 430). For example, server device 220 may store fast geolocation information based on performing the fast geolocation process. Stored fast geolocation information may include location information (e.g., a determined location of user equipment 210 based on performing a fast geolocation process), identification information (e.g., information associated with identifying user equipment 210), or the like. For example, server device 220 may store information identifying a particular location of user equipment 210 determined based on a particular connection segment of a call associated with user equipment 210. Additionally, or alternatively, server device 220 may parse the event information, and may store parsed event information in association with the location information. For example, server device 220 may store a set of call quality metrics (e.g., required call quality metrics, desired call quality metrics, observed call quality metrics, etc.) associated with a particular connection segment from which server device 220 determined a location of a particular user equipment 210. In this case, server device 220 may store a received signal code power (RSCP) value, a reference signal received power (RSRP), received signal level (RxLev), reference signal received quality (RSRQ), an energy per chip (Ec) divided by total received power spectral density in a bandwidth of interest (No) value (e.g., Ec/No value), a received signal strength indicator (RSSI), a quality of service (QoS) class identifier (QCI), a channel quality identifier (CQI), or the like. In this way, server device 220 may provide additional information that may be utilized for determining a slope-intercept value, for performing network diagnostics, or the like.

In some implementations, server device 220 may select a particular data structure from a set of data structures based on a location associated with the particular data structure. For example, server device 220 may select a particular data structure associated with storing information associated with a particular location. In this case, when server device 220 intends to obtain information associated with the particular location, such as information regarding a connection segment determined to have occurred at the particular location, server device 220 may identify the particular data structure and obtain the information, thereby reducing a quantity of time required to obtain the information relative to storing information regarding all locations via a single data structure. In some implementations, server device 220 may periodically remove information from the data structure. For example, server device 220 may store a record of a connection segment for a particular period of time (e.g., 1 hour, 1 day, 1 month, etc.), and may remove the record of the connection segment after the particular period of time has elapsed. In this way, server device 220 may reduce a data storage requirement relative to maintaining records in perpetuity.

In some implementations, server device 220 may store the fast geolocation information via a data structure intended for utilization in performing a slow geolocation process. For example, server device 220 may include multiple data structures, each storing different information, such as a data structure storing information determined based on performing a fast geolocation process for utilization in performing a slow geolocation process, a data structure storing information determined based on performing a slow geolocation process for utilization in performing a fast geolocation process, a data structure storing event information for logging and/or analysis, or the like. In some implementations, server device 220 may store the fast geolocation information via the data structure to buffer the data for performing a slow geolocation process. For example, server device 220 may store the fast geolocation information via a short-term storage data structure (e.g., a data delivery system), thereby buffering the fast geolocation information for further processing by a module of server device 220 associated with performing a slow geolocation process (e.g., slow geolocation module 270 or the like).

As further shown in FIG. 4, process 400 may include performing a slow geolocation process based on the event information and stored fast geolocation information (block 440). For example, server device 220 may perform the slow geolocation (e.g., a second geolocation relative to the first, fast geolocation) based on the event information and stored fast geolocation information. In some implementations, server device 220 may determine one or more parameters associated with determining a location when performing a slow geolocation process. For example, based on event information associated with one or more user equipment 210, one or more connection segments, or the like, server device 220 may determine a set of slope-intercept values for a portion of a network (e.g., a coverage area associated with a particular base station).

In some implementations, server device 220 may perform the slow geolocation to determine a refined location (e.g., more accurate relative to a location determined based on performing a fast geolocation process). For example, server device 220 may determine, for a particular user equipment 210 at a particular time, a first location via a fast geolocation process with an expected first level of accuracy and a second location via slow geolocation with an expected second, higher level of accuracy.

In some implementations, server device 220 may determine a location for multiple connection segments of a particular call. For example, server device 220 may determine a first location for a first connection segment of a call and a second location for a second connection segment of the call. In some implementations, server device 220 may utilize multiple locations associated with multiple connection segments to determine a location of a call. For example, server device 220 may average the first location and the second location to determine a location for the call. Additionally, or alternatively, server device 220 may update a location for a particular connection segment based on a location determined for a subsequent connection segment, thereby improving a level of accuracy associated with a location of user equipment 210 (e.g., for utilization in performing network diagnostics, coverage blackout spot identification, forensic investigation, or the like).

Additionally, or alternatively, server device 220 may determine information regarding user equipment 210 based on the multiple locations. For example, when the first location and the second location are within a particular proximity of a road and a threshold distance apart, server device 220 may determine that user equipment 210 is being operated by a user traveling via the road, and may alter the location (and/or one or more other locations determined for user equipment 210) to provide a location for user equipment 210 on the road. In this way, server device 220 may utilize additional contextual information (e.g., map information or the like) to improve geolocation of user equipment 210 relative to performing geolocation without utilizing additional contextual information.

As further shown in FIG. 4, process 400 may include storing slow geolocation information based on performing the slow geolocation process (block 450). For example, server device 220 may store the slow geolocation information based on performing the slow geolocation process. Slow geolocation information may include information associated with identifying user equipment 210 (e.g., an IMSI, a user identifier, a phone number, a hash of a value, such as an IMSI, a user identifier, a phone number, or the like, etc.), information associated with a connection segment (e.g., a signal strength measurement, a signal quality measurement, a call-type, etc.), information determined based on performing a slow geolocation process (e.g., a set of updated slope-intercept values, information identifying a location, etc.), or the like. Additionally, or alternatively, server device 220 may store slow geolocation information identifying a set of slope-intercept values for a subsequent geolocation of one or more user equipment 210.

As further shown in FIG. 4, process 400 may include selectively providing location information based on performing the fast geolocation process or the slow geolocation process (block 460). For example, server device 220 may selectively provide location information based on performing the fast geolocation process and/or the slow geolocation process. In some implementations, server device 220 may provide location information identifying a location for user equipment 210 based on performing a fast geolocation process. For example, server device 220 may provide, in real-time or near real-time (relative to receiving event information), location information determined based on performing a fast geolocation process, such as to an application server associated with providing advertisements, public service announcements, public safety announcements, or the like. Additionally, or alternatively, server device 220 may provide location information determined based on performing a slow geolocation process, such as to a user access terminal for utilization in identifying network performance, identifying a coverage blackout spot (e.g., a location within a network coverage area that lacks network coverage), identifying network congestion, or the like.

In some implementations, server device 220 may provide location information based on receiving a request for location information. For example, server device 220 may store fast geolocation information for a particular user equipment 210, and may replace the fast geolocation information with slow geolocation information for the particular user equipment 210 based on determining the slow geolocation information. In this case, server device 220 may provide the slow geolocation information (i.e., the more accurate location information) as a response to a request for information identifying a location of the particular user equipment 210. In this way, server device 220 identifies the location of the particular user equipment 210 with a greater level of accuracy (than based on the fast geolocation process) after performing the slow geolocation process.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, server device 220 provides real-time or near real-time (relative to receiving event information) location information with a first level of accuracy for providing location dependent information and determines non real-time or near real-time (relative to receiving event information) location information with a second, higher level of accuracy for permitting network diagnostics, improving fast geolocation, or the like. Moreover, based on providing real-time or near real-time (relative to receiving event information) location information, server device 220 permits enhanced location targeting of alerts, such as advertising alerts, safety alerts, or the like relative to utilizing periodic (e.g., non-real-time or near real-time relative to receiving event information) location updates. In this way, server device 220 reduces messages transmitted via a network to user equipment 210 not within a particular proximity to a location and/or improves network diagnostics relative to utilizing inaccurate or outdated location information.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors configured to:
pre-calculate, based on a set of received measurements, information associated with determining a set of locations for a set of user equipment,
where the one or more processors, when pre-calculating the information, are configured to:
determine a set of slope-intercept values based on the set of received measurements; and
store the set of slope-intercept values as the pre-calculated information;
determine, based on one or more measurements of the set of received measurements and the pre-calculated information, one or more locations of the set of locations associated with one or more user equipment of the set of user equipment,
a particular location, of the one or more locations, being associated with a particular user equipment, of the one or more user equipment, at a particular time; and
provide information identifying the one or more locations, including the particular location associated with the particular user equipment at the particular time, based on the determining of the one or more locations.

2. The device of claim 1, where the one or more measurements relate to one or more connection segments; and
where the one or more processors are further configured to:
obtain additional information associated with the one or more user equipment;
determine, based on the additional information, updated pre-calculated information;
store the updated pre-calculated information as stored updated pre-calculated information;
receive another measurement relating to another connection segment; and
determine another location based on the another measurement and the stored updated pre-calculated information.

3. The device of claim 1, where the one or more processors are further configured to:
obtain additional information associated with the one or more user equipment;
determine, based on the additional information, one or more refined locations for the one or more user equipment,
a particular refined location, of the one or more refined locations, being associated with the particular user equipment at the particular time; and
provide information identifying the one or more refined locations.

4. The device of claim 1, where the one or more processors are further configured to:
receive the set of received measurements.

5. The device of claim 1, where the one or more processors, when providing the information identifying the one or more locations, are configured to:
provide, in less than 15 minutes from receiving the one or more measurements, the information identifying the one or more locations.

6. The device of claim 1, where the one or more processors, when providing the information identifying the one or more locations, are configured to:
provide, in less than 2 minutes from receiving the one or more measurements, the information identifying the one or more locations.

7. The device of claim 1, where a measurement, of the one or more measurements, is a signal strength measurement; and
where the one or more processors are further configured to:
determine an expected signal degradation for a base station based on another one or more measurements, the base station being utilized by the particular user equipment;
where the one or more processors, when determining the set of slope-intercept values, are to:
determine, based on the expected signal degradation, the set of slope-intercept values; and
where the one or more processors, when determining the one or more locations, are configured to:
correlate the signal strength measurement to a particular proximity to the base station based on the pre-calculated information; and
determine the particular location of the particular user equipment based on the particular proximity to the base station.

8. A non-transitory computer-readable medium storing instructions, the instructions comprising:
one or more instructions that, when executed by one or more processors, cause the one or more processors to:
receive, in near real-time, event information regarding a user equipment;
obtain, from a data structure, stored slope-intercept information associated with identifying a location of the user equipment;
determine, in near real-time relative to receiving the event information, a first location of the user equipment based on the event information and the stored slope-intercept information;
provide, in near real-time relative to receiving the event information, information identifying the first location;
determine, based on the event information and after determining the first location, updated slope-intercept information;
store the updated slope-intercept information for utilization in determining another location in real-time or near-real time;
determine, based on the updated slope-intercept information, a second location of the user equipment, the second location being more accurate than the first location; and
provide information identifying the second location.

9. The non-transitory computer-readable medium of claim 8, where the one or more instructions, that cause the one or more processors to determine the first location, cause the one or more processors to:
identify a measurement included in the event information;
determine that the measurement corresponds to a particular proximity to a particular network device based on the stored slope-intercept information; and
determine the first location based on the particular proximity to the particular network device.

10. The non-transitory computer-readable medium of claim 8, where the one or more instructions, that cause the one or more processors to provide the information identifying the first location, cause the one or more processors to:
provide the information identifying the first location to cause the user equipment to receive location dependent information.

11. The non-transitory computer-readable medium of claim 8, where the one or more instructions, that cause the one or more processors to provide the information identifying the second location, cause the one or more processors to:
provide the information identifying the second location to facilitate network diagnostics.

12. The non-transitory computer-readable medium of claim 8, where the event information is first event information; and
where the one or more instructions, when executed by the one or more processors, further cause the one or more processors to:
receive, in near real-time, second event information regarding the user equipment;
correlate the first event information and the second event information based on information identifying the user equipment included in the first event information and the second event information; and
where the one or more instructions, that cause the one or more processors to determine the first location, cause the one or more processors to:
determine the first location based on the first event information and the second event information based on correlating the first event information and the second event information.

13. The non-transitory computer-readable medium of claim 8, where the one or more instructions, when executed by the one or more processors, further cause the one or more processors to:
store information identifying the first location as stored location information via a data structure; and
store information identifying the second location as updated stored location information after storing the information identifying the first location;
receive a request for information identifying a location of the user equipment; and
provide the updated stored location information.

14. The non-transitory computer-readable medium of claim 8, where the one or more instructions, when executed by the one or more processors, are further to:
store the information identifying the first location via a buffer; and
where the one or more instructions, that cause the one or more processors to determine the updated slope-intercept information, cause the one or more processors to:
obtain the information identifying the first location from the buffer; and determine the updated slope-intercept information based on the information identifying the first location.

15. A method, comprising:

obtaining, by a device, event information regarding a set of user equipment;

determining, by the device, a first location for a particular user equipment, of the set of user equipment, based on the event information and a stored set of slope-intercept values for identifying a location of the particular user equipment;

providing, by the device, information associated with identifying the first location;

determining, by the device, a second location for the particular user equipment based on the information associated with the identifying the first location and after determining the first location;

providing, by the device, information associated with the identifying the second location;

updating, by the device, the stored set of slope-intercept values, based on determining the second location, as a set of updated slope-intercept values; and using, by the device, the set of updated slope-intercept values to determine another location for the particular user equipment.

16. The method of claim 15, further comprising:

obtaining other event information; and where using the set of updated slope-intercept values to determine the other location comprises:

determining the other location for the particular user equipment based on the other event information and the set of updated slope-intercept values; and providing information identifying the other location for the particular user equipment.

17. The method of claim 15, where the event information includes a measurement associated with a connection segment; and where determining the first location for the particular user equipment comprises:

determining the first location for the particular user equipment in near real-time relative to the connection segment occurring.

18. The method of claim 15, where the second location is more accurate than the first location, the second location and the first location relating to a location of the particular user equipment at a particular time.

19. The method of claim 15, where providing the information associated with the identifying the first location further comprises:

providing information identifying the particular user equipment.

20. The method of claim 15, where determining the first location for the particular user equipment comprises:

performing a first geolocation process; and where determining the second location for the particular user equipment comprises:

performing a second geolocation process, the first geolocation process determining the first location faster than the second geolocation process determining the second location.

* * * * *